(12) United States Patent
Seitz et al.

(10) Patent No.: US 7,958,446 B2
(45) Date of Patent: Jun. 7, 2011

(54) SYSTEMS AND METHODS FOR LANGUAGE TRANSLATION IN NETWORK BROWSING APPLICATIONS

(75) Inventors: Edward Seitz, Atlanta, GA (US);
Brockton Davis, Marietta, GA (US);
Derrick Whittle, Marietta, GA (US);
James Bollas, Columbus, OH (US)

(73) Assignee: Yahoo! Inc., Sunnyvale, CA (US)

( * ) Notice: Subject to any disclaimer, the term of this patent is extended or adjusted under 35 U.S.C. 154(b) by 1024 days.

(21) Appl. No.: 11/261,675

(22) Filed: Oct. 31, 2005

(65) Prior Publication Data
US 2006/0265652 A1    Nov. 23, 2006

Related U.S. Application Data

(60) Provisional application No. 60/681,458, filed on May 17, 2005.

(51) Int. Cl.
*G06F 17/00* (2006.01)
*G10L 13/00* (2006.01)

(52) U.S. Cl. ........ 715/249; 715/205; 715/703; 715/764; 715/810; 715/853; 704/2; 704/269; 704/277

(58) Field of Classification Search .................. 345/734, 345/736, 848, 856; 704/8, 1, 2, 5, 7–9, 200, 704/201, 203, 205, 226, 238, 257, 269, 270, 704/277, E15.003, E15.004, E15.005, E15.006, 704/E15.007, E15.009, E15.016, E15.018, 704/E21.019; 707/500.1; 709/203, 218, 709/220, 223, 226, 246; 715/238, 264, 500, 715/513, 516, 522, 536, 736, 200–205, 209, 715/210, 226, 229, 231, 234, 239, 243, 246, 715/249, 253, 256, 265, 273, 700, 703, 760, 764, 810, 845, 853, 854, 858, 860, 861
See application file for complete search history.

(56) References Cited

U.S. PATENT DOCUMENTS

| | | | |
|---|---|---|---|
| 5,917,491 A | | 6/1999 | Bauersfeld |
| 5,987,402 A | * | 11/1999 | Murata et al. ...................... 704/2 |
| 6,061,738 A | | 5/2000 | Osaku et al. |
| 6,088,731 A | | 7/2000 | Kiraly et al. |
| 6,091,409 A | | 7/2000 | Dickman et al. |
| 6,195,707 B1 | | 2/2001 | Minh |

(Continued)

OTHER PUBLICATIONS

International Search Report (PCT/US06/12023).

(Continued)

*Primary Examiner* — Maikhanh Nguyen
(74) *Attorney, Agent, or Firm* — James J. DeCarlo; Greenberg Traurig, LLP

(57) ABSTRACT

A browsing application for accessing resources over a network includes code for receiving a command from a user to translate textual material appearing on an arbitrary page displayed in the content display area, and code for causing the textual material to be passed to a translation resource on the network, whereby the display area of the browsing application is caused to display a page which includes a translation of the textual material. The application may display a menu accessible from an arbitrary page whereby the user may select among translation options such as a translate to language and a translate from language. The application may be configured to cause text selected by a user to be translated, and/or may cause an entire page to be translated. Translated text may be displayed along with graphics in a layout similar to that of the original page.

23 Claims, 5 Drawing Sheets

U.S. PATENT DOCUMENTS

| | | | |
|---|---|---|---|
| 6,237,030 | B1 | 5/2001 | Adams et al. |
| 6,266,060 | B1 | 7/2001 | Roth |
| 6,297,819 | B1 | 10/2001 | Furst |
| 6,308,212 | B1 | 10/2001 | Besaw et al. |
| 6,338,033 | B1* | 1/2002 | Bourbonnais et al. ............ 704/3 |
| 6,427,175 | B1 | 7/2002 | Khan et al. |
| 6,476,833 | B1 | 11/2002 | Moshfeghi |
| 6,535,912 | B1 | 3/2003 | Anupam et al. |
| 6,628,311 | B1 | 9/2003 | Fang |
| 6,643,661 | B2 | 11/2003 | Polizzi et al. |
| 6,826,540 | B1 | 11/2004 | Plantec et al. |
| 6,832,263 | B2 | 12/2004 | Polizzi et al. |
| 6,857,022 | B1 | 2/2005 | Scanlan |
| 6,918,090 | B2 | 7/2005 | Hesmer et al. |
| 6,993,473 | B2* | 1/2006 | Cartus ................. 704/2 |
| 7,020,696 | B1 | 3/2006 | Perry et al. |
| 7,058,726 | B1 | 6/2006 | Osaku et al. |
| 7,103,642 | B1 | 9/2006 | Chen et al. |
| 7,124,185 | B2 | 10/2006 | Kuroyanagi |
| 7,185,044 | B2 | 2/2007 | Ryan et al. |
| 7,194,552 | B1 | 3/2007 | Schneider |
| 7,216,292 | B1 | 5/2007 | Snapper et al. |
| 7,228,493 | B2 | 6/2007 | Kosak et al. |
| 7,277,718 | B2 | 10/2007 | Wong |
| 7,278,092 | B2 | 10/2007 | Krzanowski |
| 7,281,049 | B2 | 10/2007 | Verma et al. |
| 7,293,019 | B2 | 11/2007 | Dumais et al. |
| 7,512,710 | B2 | 3/2009 | Allen et al. |
| 7,580,960 | B2* | 8/2009 | Travieso et al. ........ 1/1 |
| 2001/0029455 | A1* | 10/2001 | Chin et al. ........ 704/277 |
| 2001/0041578 | A1 | 11/2001 | Na |
| 2002/0042799 | A1 | 4/2002 | Slotznick |
| 2002/0138331 | A1 | 9/2002 | Hosea et al. |
| 2002/0194300 | A1* | 12/2002 | Lin et al. .......... 709/217 |
| 2003/0101116 | A1 | 5/2003 | Rosko et al. |
| 2003/0104827 | A1 | 6/2003 | Moran et al. |
| 2003/0221167 | A1* | 11/2003 | Goldstein et al. ........ 715/513 |
| 2004/0044518 | A1* | 3/2004 | Reed et al. ........... 704/8 |
| 2004/0098360 | A1 | 5/2004 | Witwer et al. |
| 2004/0098451 | A1 | 5/2004 | Mayo |
| 2004/0098467 | A1 | 5/2004 | Dewey et al. |
| 2004/0102201 | A1* | 5/2004 | Levin ............... 455/466 |
| 2004/0102956 | A1* | 5/2004 | Levin ............... 704/2 |
| 2004/0193597 | A1 | 9/2004 | Johnson |
| 2004/0225749 | A1 | 11/2004 | Pavlik et al. |
| 2005/0216834 | A1 | 9/2005 | Gu |
| 2005/0216837 | A1 | 9/2005 | Washburn |
| 2005/0267973 | A1 | 12/2005 | Carlson et al. |
| 2005/0289147 | A1 | 12/2005 | Kahn et al. |
| 2005/0289468 | A1 | 12/2005 | Kahn et al. |
| 2006/0004830 | A1 | 1/2006 | Lora et al. |
| 2006/0047649 | A1 | 3/2006 | Liang |
| 2006/0085741 | A1 | 4/2006 | Weiner et al. |
| 2006/0167860 | A1 | 7/2006 | Eliashberg et al. |
| 2006/0173985 | A1 | 8/2006 | Moore |
| 2006/0200740 | A1 | 9/2006 | Kahn et al. |
| 2006/0253459 | A1 | 11/2006 | Kahn et al. |
| 2006/0265472 | A1 | 11/2006 | Seitz et al. |
| 2006/0265481 | A1 | 11/2006 | Seitz et al. |
| 2006/0265518 | A1 | 11/2006 | Owens et al. |
| 2007/0073701 | A1 | 3/2007 | Miller et al. |
| 2007/0106627 | A1 | 5/2007 | Srivastava et al. |
| 2007/0174286 | A1 | 7/2007 | Seitz et al. |
| 2007/0220441 | A1 | 9/2007 | Melton et al. |
| 2008/0133487 | A1 | 6/2008 | Gross et al. |
| 2008/0275967 | A1 | 11/2008 | Borman et al. |

OTHER PUBLICATIONS

Molly Montgomery, RSS Tutorial, Dec. 2003, The Lone Star Librarian, vol. 56:2, pp. 1-6.
Alan Levine, Pssss . . . Have You Heard About RSS?, Dec. 1, 2003, mcli Fourm, vol. 6, pp. 8-11.
M.Pilgrim (IBM), P.Ringnalda, Ed. "Atom Feed Autodiscovery", pp. 1-14, May 10, 2005 http://www.ietf.org/internet-drafts/draft-ietf-atompub-autodiscovery-01.txt.
J.Gregorio, Ed. (BitWorking, Inc.), B.de hOra, Ed. (Propylon Ltd.), "The Atom Publishing Protocol", pp. 1-40 Oct. 11, 2005 http://www.ietf.org/internet-drafts/draft-ietf-atompub-protocol-05.txt.
M.Nottingham, Ed., R.Sayre, Ed., "The Atom Syndication Format", pp. 1-53, Aug. 15, 2005 http://www.ietf.org/internet-drafts/draft-ietf-atompub-format-11.txt.
Dave Winer, "RSS 2.0 Specification", pp. 1-10, Jan. 30, 2005 http://blogs.law.harvard.edu/tech/rss.
"What is RSS: A Tutorial Introduction to Feed and Aggregators", pp. 1-4, Jul. 6, 2004 © 2004 Software Garden, Inc. http://rss.softwaregarden.com/aboutrss.html.
Official Action from the United States Patent and Trademark Office for U.S. Appl. No. 11/251,784 dated May 12, 2009.
Official Action from the United States Patent and Trademark Office for U.S. Appl. No. 11/251,784 dated Nov. 12, 2008.
Official Action from the United States Patent and Trademark Office for U.S. Appl. No. 11/251,784 dated Jul. 22, 2008.
Official Action from the United States Patent and Trademark Office for U.S. Appl. No. 11/251,784 dated Feb. 5, 2008.
Official Action from the United States Patent and Trademark Office for U.S. Appl. No. 11/434,935 dated Jul. 8, 2009.
Official Action from the United States Patent and Trademark Office for U.S. Appl. No. 11/434,935 dated Dec. 18, 2008.
Official Action from the United States Patent and Trademark Office for U.S. Appl. No. 11/261,672 dated Aug. 12, 2009.
Official Action from the United States Patent and Trademark Office for U.S. Appl. No. 11/261,672 dated Mar. 16, 2009.
Official Action from the United States Patent and Trademark Office for U.S. Appl. No. 11/261,672 dated Oct. 24, 2008.
Official Action from the United States Patent and Trademark Office for U.S. Appl. No. 11/261,672 dated Jul. 3, 2008.
Official Action from the United States Patent and Trademark Office for U.S. Appl. No. 11/261,672 dated Feb. 5, 2008.
Official Action from the United States Patent and Trademark Office for U.S. Appl. No. 11/434,893 dated Mar. 18, 2009.
Official Action from the United States Patent and Trademark Office for U.S. Appl. No. 11/434,893 dated Dec. 11, 2008.
Official Action from the United States Patent and Trademark Office for U.S. Appl. No. 11/434,893 dated May 5, 2008.
Official Action from the United States Patent and Trademark Office for U.S. Appl. No. 11/434,893 dated Sep. 2, 2009.
Official Action issued in connection with U.S. Appl. No. 11/251,784 mailed Sep. 17, 2010.
Official Action issued in connection with U.S. Appl. No. 11/251,784 mailed Apr. 1, 2010.
Official Action issued in connection with U.S. Appl. No. 11/251,784 mailed Oct. 21, 2009.
Official Action issued in connection with U.S. Appl. No. 11/434,935 mailed May 20, 2010.
Official Action issued in connection with U.S. Appl. No. 11/434,935 mailed Dec. 7, 2009.
Official Action issued in connection with U.S. Appl. No. 11/261,672 mailed Oct. 14, 2010.
Official Action issued in connection with U.S. Appl. No. 11/261,672 mailed Dec. 29, 2009.
Official Action issued in connection with U.S. Appl. No. 11/434,893 mailed Oct. 8, 2010.
Official Action issued in connection with U.S. Appl. No. 11/434,893 mailed Mar. 31, 2010.
Official Action issued in connection with U.S. Appl. No. 11/434,893 mailed Sep. 2, 2009.

* cited by examiner

SYSTEMS AND METHODS FOR LANGUAGE TRANSLATION IN NETWORK BROWSING APPLICATIONS

This application claims the benefit of U.S. Provisional Patent Application Ser. No. 60/681,458 filed May 17, 2005 entitled Systems and Methods for Providing Features and User Interface in Network Browsing Applications, the disclosure of which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of network browsing-enabled applications, and in particular to systems and methods for providing language translation features in such applications.

BACKGROUND OF THE INVENTION

Network browsing applications allow a computer user to view the contents of a network. Some network browsing applications, like Windows Explorer distributed by the Microsoft Corporation of Redmond, Wash., focus on specific types of networks and/or files. For example, Windows Explorer is primarily oriented toward browsing files in a local area network. Other network browsing applications, such as Netscape Navigator, distributed by Netscape Corporation of Mountain View, Calif., or Internet Explorer, distributed by the Microsoft Corporation, allow users to install "plug-in" applications that allow the network browsing application to work with additional file types. Additional examples of network browsing applications, referred to herein as "browsing applications" for simplicity, include, without limitation, internet browsers, mail programs with browsing capabilities, file-sharing applications, and any application which provides the capability to browse resources either on an external network (e.g., the internet) or an internal network. Such applications may be separate from or integrated into an operating system.

Many browsing application developers have focused their development efforts in the manner described above in an effort to meet certain market needs. Unfortunately, while the developers have greatly enhanced underlying browsing application functionality, they have not spent much time enhancing the user interface and related features associated with browsing applications.

One such feature is the browsing application's foreign language display capabilities. Many browsers have historically struggled to display non-ASCII characters, including pictographs, ideograms and cuneiform characters such as those used in many Asian languages and Middle Eastern languages. Given the difficulty browsers faced simply displaying such characters, it is little wonder that efforts to enhance the browsing application's multi-lingual capabilities have been slow to mature.

By way of example, browsing applications cannot perform linguistic translation. At best, language translation can be performed through software running on the user's computer, such as Systran 5.0, distributed by Systran Language Translation Systems of Paris, France, or Lec, distributed by Language Engineering Company, LLC of Belmont, Mass., or via a server-based web page, such as http://babelfish.altavista.com or http://dictionary.reference.com/translate. However, even where the translation is performed by a server-based web page, the user must navigate away from the current web page before the translation can be initiated. This is, at the least, inconvenient for the user.

What is needed is a means through which a user can more readily translate an entire page, or portion thereof, that is displayed in a browsing application.

SUMMARY OF THE INVENTION

Accordingly, the present invention is directed to systems and methods for providing features and user interfaces in network browsing applications that substantially obviate one or more of the problems due to limitations and disadvantages of the related art.

In one embodiment a browsing application for accessing resources over a network includes code for receiving a command from a user to translate textual material appearing on an arbitrary page displayed in a display area of the browsing application, and code for causing the textual material to be passed to a translation resource on the network, whereby the display area of the browsing application is caused to display a page which includes a translation of the textual material. The application may display a menu accessible from an arbitrary page whereby the user may select among translation options such as a translate to language and a translate from language. The application may further be configured to cause text selected by a user to be translated, and/or may cause an entire page to be translated. Translated text may be displayed along with graphics in a layout similar to that of the original page.

In other embodiments the browsing application includes code for retrieving and displaying network resources in a display area in accordance with a uniform resource locator entered or selected in an address field, code for receiving a command from a user to translate selected textual material appearing on an arbitrary page displayed in the display area, and code for causing the selected textual material to be passed to a translation resource on the network, whereby the display area is caused to display a page comprising a translation of the selected textual material.

In further embodiments code is provided for use in connection with a browsing application, the code including code for receiving a command from a user to translate textual material appearing on an arbitrary page displayed in the display area, and code for causing the textual material to be passed to a translation resource on the network, whereby the display area is caused to display a page including a translation of the textual material, wherein the entire page is displayed with the translation of the textual material arranged among graphics in a manner similar to that of the original untranslated arbitrary page.

Although the embodiments set forth above are directed to textual material, it should be apparent to one skilled in the art that graphical representations of textual material, including cuneiform and other such characters, may be the subject of translation without departing from the spirit or the scope of the invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

DETAILED DESCRIPTION OF THE PREFERRED EMBODIMENTS

Reference will now be made in detail to the preferred embodiments of the present invention, examples of which are illustrated in the accompanying drawings.

The disclosed embodiments relate to improved language translation features for network browsing-enabled applications. Such applications, referred to herein as "browsing applications," include, e.g., internet browsers, mail programs with browsing capabilities, file-sharing applications, and any application which provides the capability to browse resources either on an external network (e.g., the internet) or an internal network. Such applications may be separate from or integrated into an operating system.

The functionality of the embodiments described herein is provided in the form of add-ons or plug-ins to an existing browsing application such as a web browser, but can alternatively be provided in the form of features written into a browsing application at the application's source code level. In certain embodiments, one or more of the features or functionality described below are provided as a compiled .dll file or series of compiled .dll files which are loaded at startup or runtime in connection with an existing browsing application so as to provide an improved user interface and/or additional functionality to the browsing application.

As is set forth in further detail below, one or more of the features or functionality described below can be provided or customized by a feed such as an XML feed which is delivered to the browser upon the occurrence of a triggering event. Such triggering event include, e.g., the loading of the browser into the operating system, a change in user-specific parameters, a time of day, etc. For load-balancing or other purposes, the triggering of feed downloads can be limited to a certain number of times per day, hour, minute, etc. The triggering event can occur on the client or on a server, and the feed can be requested by the client or pushed to the client from a server. In this respect, "client" as used herein can be either a client browsing application such as a web browser or a client machine in general.

FIGS. 1 through 5 illustrate embodiments wherein a language translation feature is provided by browsing application 1 in combination with a network-accessible translation engine such as a web-based translation site or locally accessible translation program, service or plug-in. In a first embodiment, illustrated in FIG. 1, browsing application 1 allows the user to highlight an arbitrary block of text or other characters 25 on an arbitrary page and display translation options 27, e.g., by right-clicking the selected characters 25 to display a menu with translation options. The menu may be a hierarchical nested menu as shown.

Figure 1:
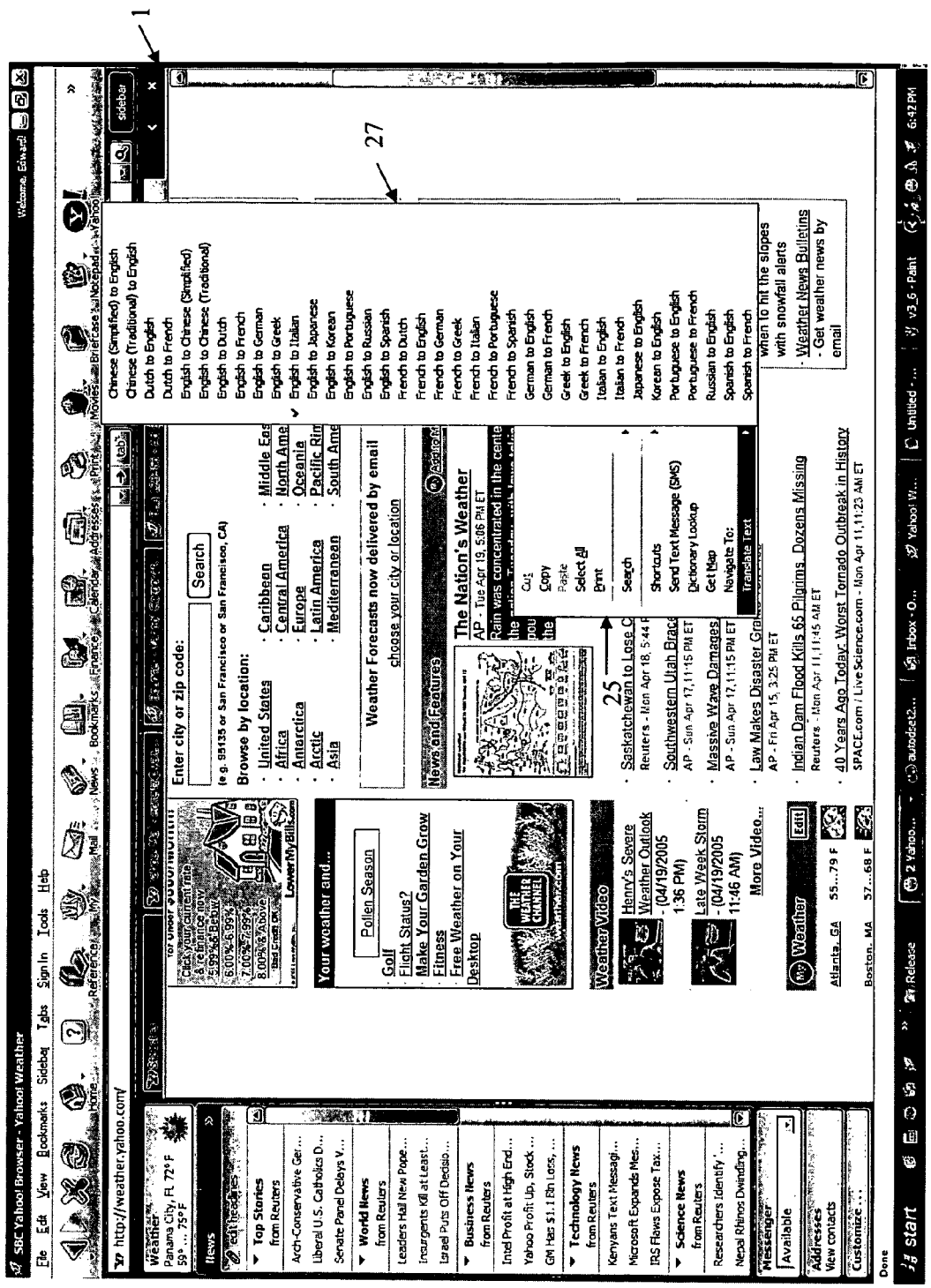
FIG. 1 is a screen capture illustrating an exemplary translation menu.
Figure 2:
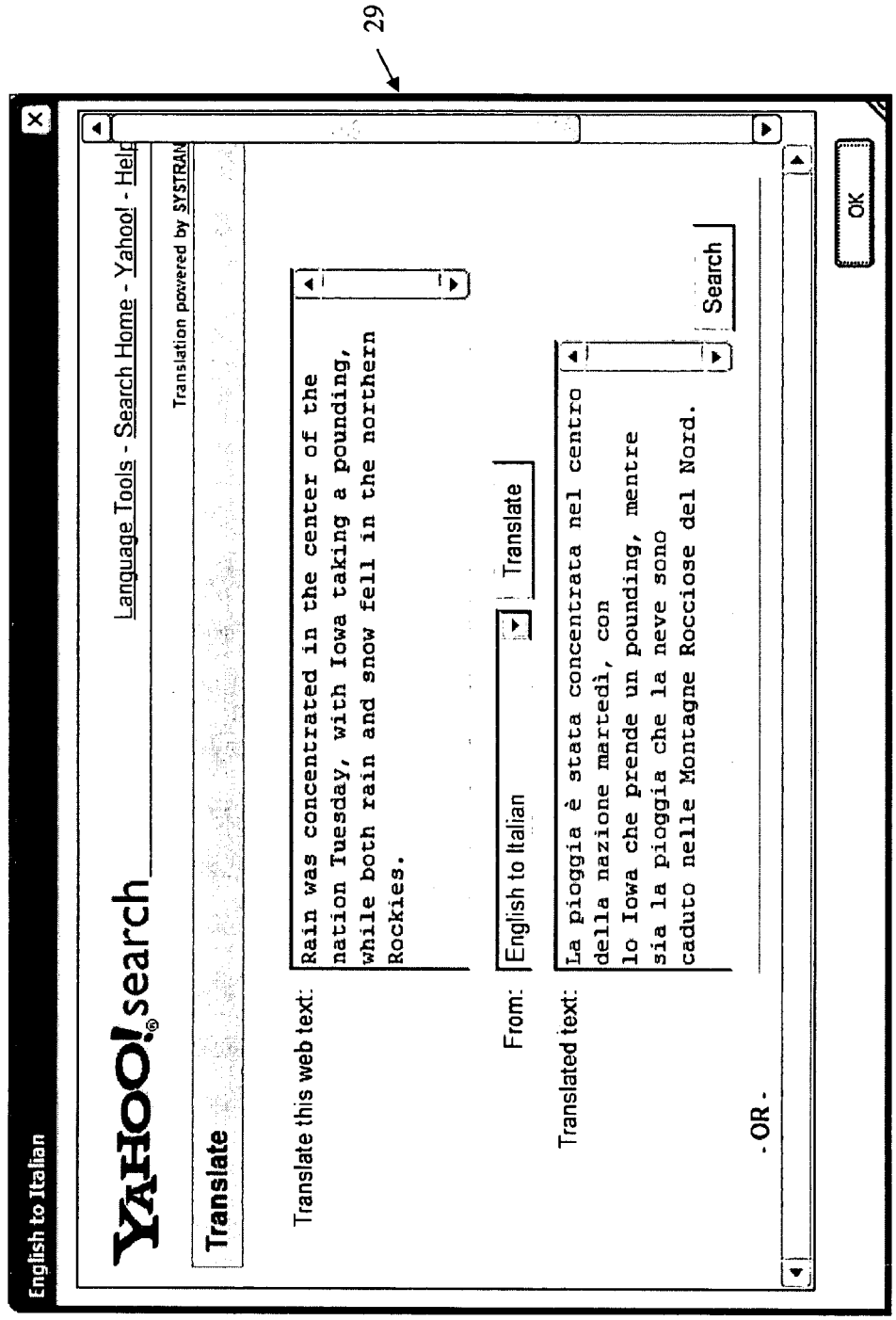
FIG. 2 is a screen capture illustrating an exemplary dialog box resulting from the selection of a translation option from the translation menu illustrated in FIG. 1.

The translation options 27 can include, but are not limited to, "from" and "to" languages such as English-to-Italian, German-to-French, Italian-to-English, Chinese-to-Japanese, Korean-to-English, Hebrew-to-Portuguese, and the like. Browsing application 1 preferably includes processes which deliver the selected characters 25 to a language translation engine on the network along with a request to translate the characters from and to the selected languages. FIG. 2 illustrates an exemplary dialog box 29 that can result from the selection of a translation option 27 illustrated in FIG. 1.

Figure 3:
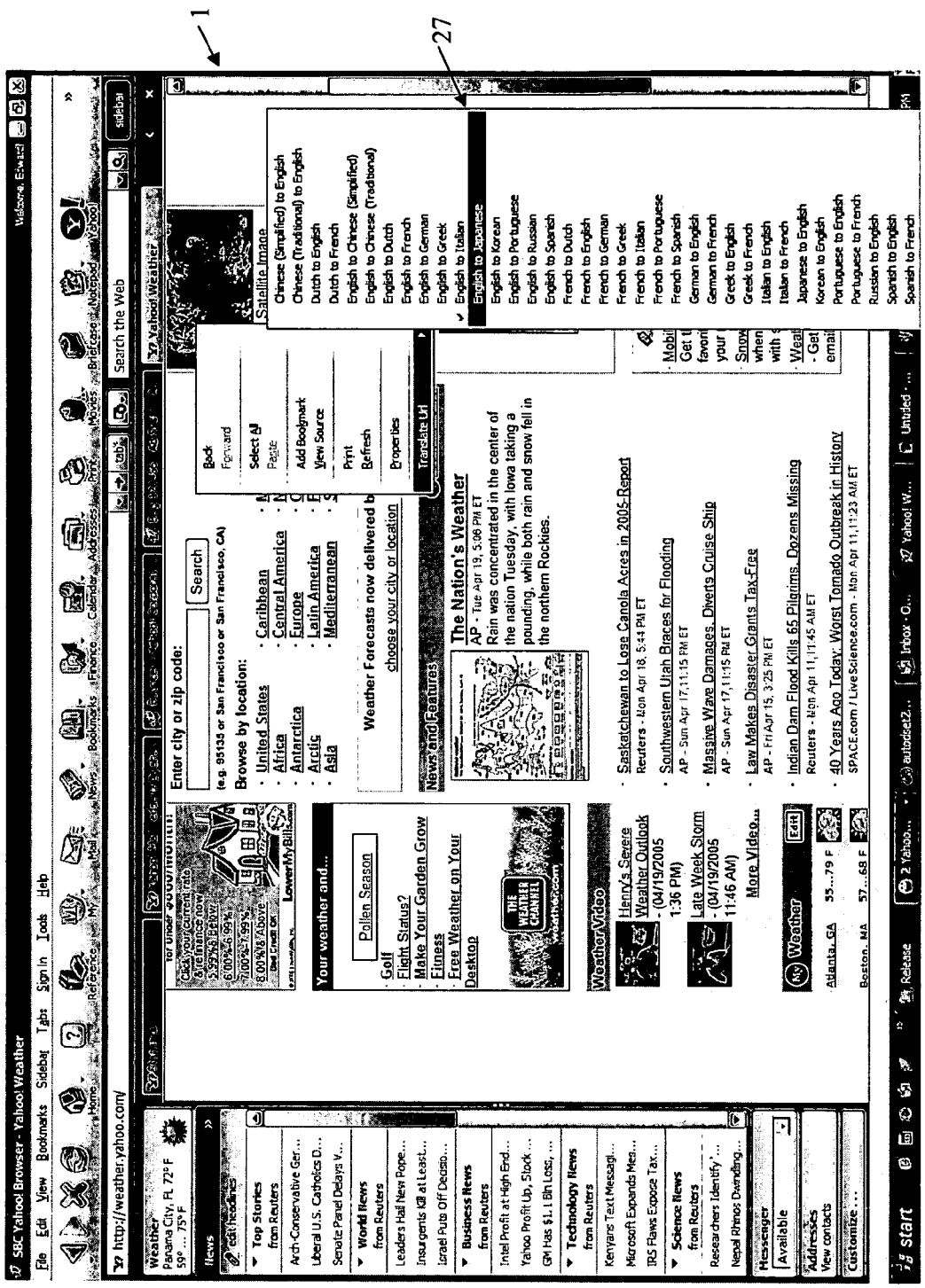
FIG. 3 is a screen capture of an embodiment of the invention wherein the entire page at a current URL is translated.

FIG. 3 illustrates an exemplary embodiment in which the user can perform language translation upon an entire page at a current URL. Browsing application 1 in accordance with this embodiment allows a user to navigate to an arbitrary page and display language translation options 27 for the page, e.g., by right-clicking anywhere in the page to display a menu of translation options. Browsing application 1 preferably includes or has associated therewith processes which receive the selected translation option, in much the same manner as is described above with regard to FIG. 1, and deliver the entire page, or alternatively just the text-related portions of the page without graphics, to a language translation engine on the network along with a request to translate the textual material from and to the selected languages. In an alternative embodiment, the processes may receive the selected translation option and deliver a URL of the page-to-be-translated to a language translation engine on the network along with a request to translate the textual material from and to the selected languages. It should be apparent to one skilled in the art that textual material as used herein may be traditional ASCII text, extended text sets, any text supported by a markup language, characters associated with any language, and/or graphical representations of characters.

Figure 4:
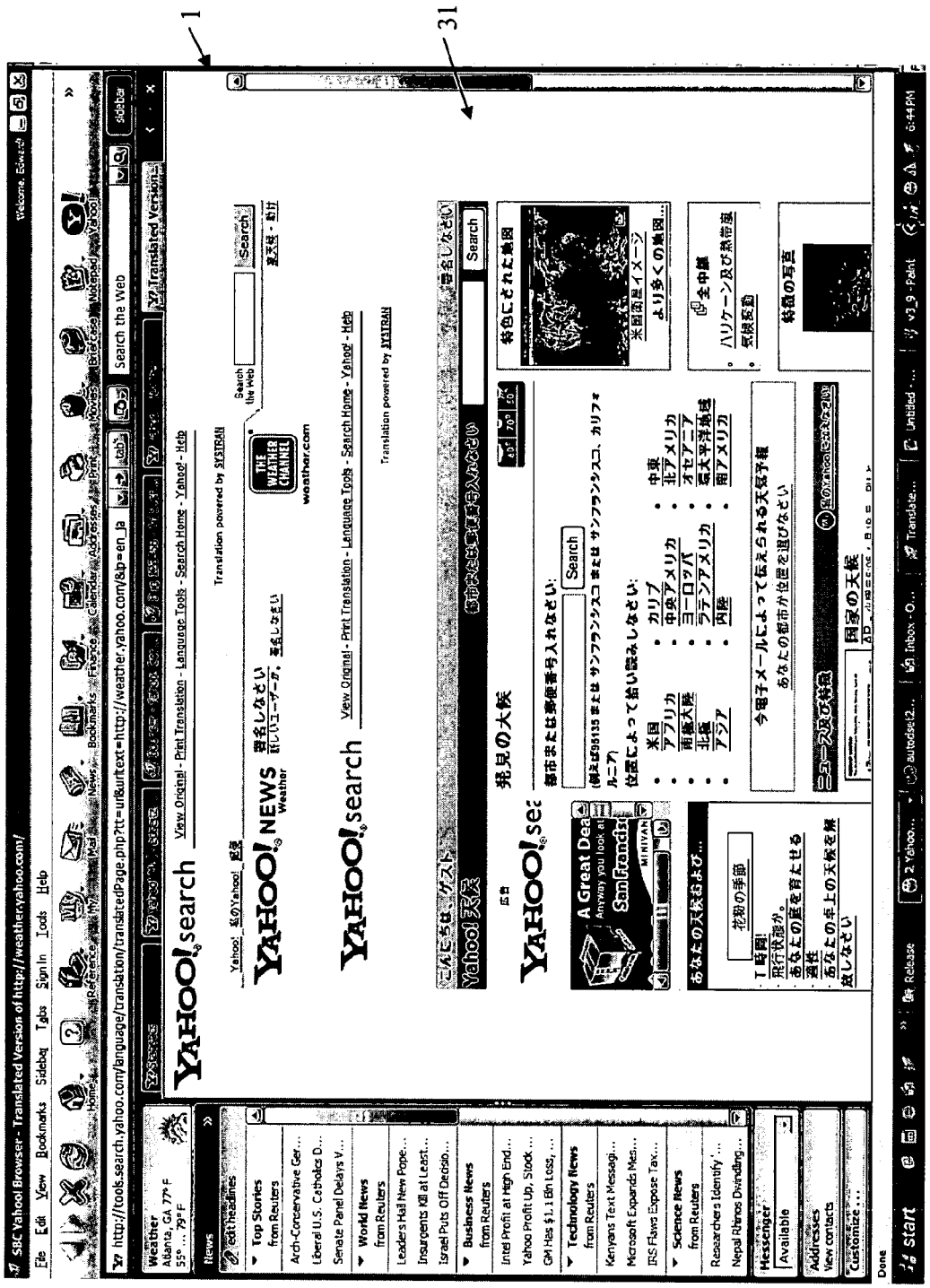
FIG. 4 is a screen capture illustrating an exemplary embodiment of the invention wherein the page at the URL of FIG. 3 has been translated.

Upon receipt of the data from the processes, the language translation engine translates the textual material from the page and returns a page which is formatted similarly or identically to the original page but which includes the translated textual material. FIG. 4 illustrates an example of a translated page 31 that has been returned and displayed in browsing application 1 as a result of the selection of a translation option as illustrated in FIG. 3. As can be seen in FIG. 4, graphics and textual material can appear on the page 31 in much the same format as in the original page, but the textual material has been translated in accordance with the "from" and "to" languages selected by the user.

Figure 5:
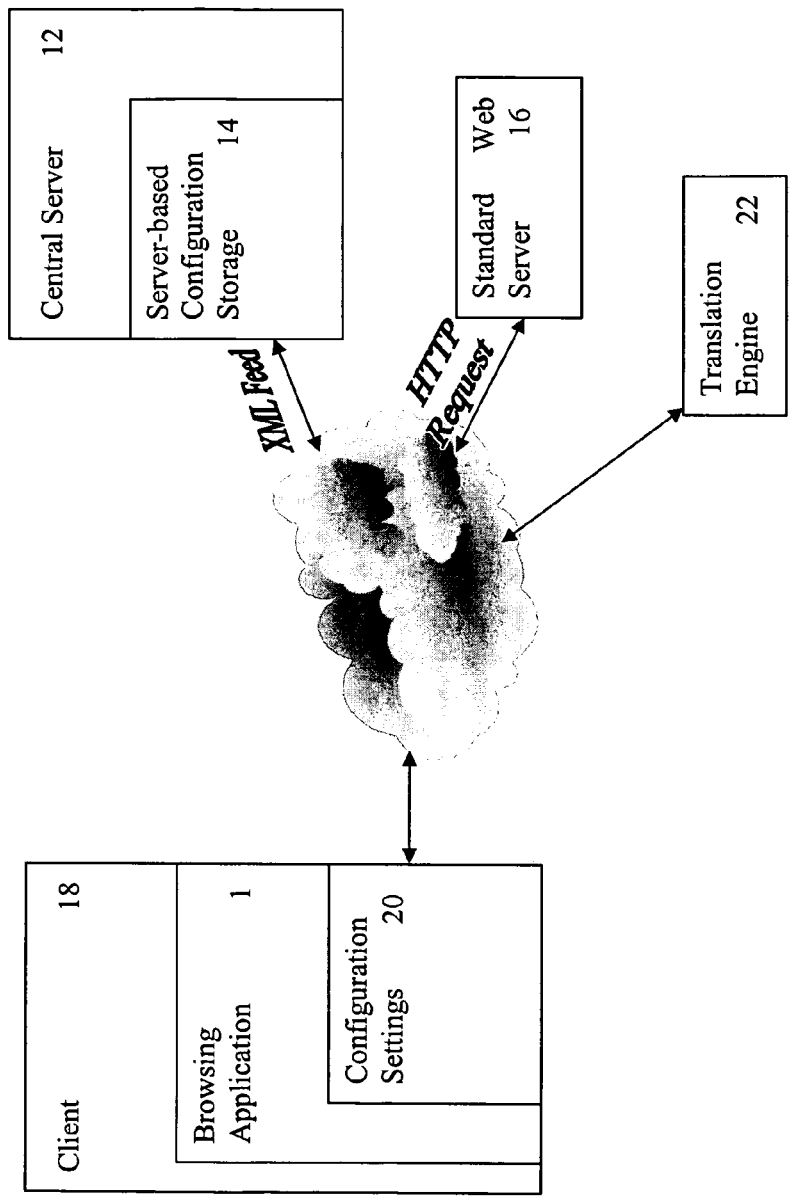
FIG. 5 is a block diagram illustrating an exemplary architecture supporting the invention.

The list of languages available for translation and other configuration settings 14 can be transmitted to the user's browsing application 1 for storage on client 1 as local configuration settings 20 in various manners. In one embodiment, as illustrated in FIG. 5, configuration settings 14 can be transmitted from central server 12 via an XML feed that is requested by browsing application 1 at the client side when the user starts browsing application 1, logs into his account, or upon the occurrence of another event.

When the user requests translation of a block of textual material or an entire page, such as a page stored on standard web server 16, browsing application 1 sends the request to translation engine 22. Translation engine 22 can translate the textual material contained in the browsing application 1's request if such textual material exists, or translation engine 22 may request and retrieve the textual material from standard web server 16 if browsing application 1 provides a URL. Translation engine 22 can then transmit the translated textual material, or a fully-formed page including graphics, to browsing application 1.

While the invention has been particularly shown and described with reference to preferred embodiments thereof, it will be understood by those skilled in the art that various changes in form and details may be made therein without departing from the spirit and scope of the invention.

The embodiments of the invention is which an exclusive property or privilege is claimed are defined as follows:

1. A computer comprising:
   a storage for storing instruction code;
   a processor for executing the instruction code, the instruction code comprising:
   code for retrieving, from a network, a web page and displaying the web page in a content display area of a browsing application executing on the computer in accordance with a uniform resource locator entered or selected in an address field;
   code for receiving a command from a user of the browsing application to translate the web page comprising textual material and graphics appearing on the web page;
   code for causing said textual material to be passed from the computer to a translation resource on the network in response to said command, wherein said code for causing said textual material to be passed to a translation resource comprises code for passing to said translation resource a uniform resource locator identifying a location of said textual material on said network; and
   code for causing said content display area to display the web page comprising a translation of said textual material, wherein said web page having translated text arranged among graphics comprises a web page having a layout which is identical to a layout of the untranslated web page,
   wherein the browsing application allows the user to navigate to said web page and right-click anywhere in the web page to display a menu of translation options for the web page; and
   wherein the browsing application allows the user to select an arbitrary block of text or other characters on said web page, selects from and to languages from the translation options, and delivers the selected arbitrary block of text or other characters to a language translation engine on the network along with a request to translate the arbitrary block of text or other characters from and to the selected languages.

2. The computer in accordance with claim 1, wherein said textual material comprises textual material selected by said user.

3. The computer in accordance with claim 2, wherein said textual material selected by said user comprises textual material which is selected by using a cursor to highlight text.

4. The computer in accordance with claim 1, wherein said command from said user comprises a selection of a menu item in said menu.

5. The computer in accordance with claim 1, wherein said menu comprises a hierarchical nested menu.

6. The computer in accordance with claim 1, wherein said textual material comprises a plurality of characters.

7. The computer in accordance with claim 1, wherein said textual material comprises a graphical representation of a plurality of characters.

8. The computer in accordance with claim 1, wherein said code for causing said textual material to be passed to a translation resource comprises code for passing said textual material to said translation resource as a parameter in said uniform resource locator.

9. A method comprising:
   retrieving, from a network, a web page and displaying the web page in a content display area of a browsing application executing on a computer in accordance with a uniform resource locator entered or selected in an address field;
   receiving a command from a user of the browsing application to translate the web page comprising textual material among graphics appearing on the web page;
   causing said textual material to be passed from the computer to a translation resource on the network, wherein said code for causing said textual material to be passed to a translation resource comprises code for passing to said translation resource a uniform resource locator identifying a location of said textual material on said network; and
   causing said content display area to display the web page comprising a translation of said textual material, wherein said translation of said textual material comprises a web page having translated text arranged among graphics in a layout which is identical to a layout of the untranslated web page,
   wherein the browsing application allows the user to navigate to said web page and right-click anywhere in the web page to display a menu of translation options for the web page; and
   wherein the browsing application allows the user to select an arbitrary block of text or other characters on said web page, selects from and to languages from the translation options, and delivers the selected arbitrary block of text or other characters to a language translation engine on the network along with a request to translate the arbitrary block of text or other characters from and to the selected languages.

10. The method in accordance with claim 9, wherein said textual material is selected by said user by using a cursor to highlight text.

11. The method in accordance with claim 9, wherein said textual material comprises a plurality of characters.

12. The method in accordance with claim 9, wherein said textual material comprises a graphical representation of a plurality of characters.

13. A computer-readable storage medium containing a set of instructions for a general purpose computer for accessing a web page over a network, the instructions comprising:
   code for retrieving, from the network, the web page and displaying the web page in a content display area of a browsing application executing on the computer in accordance with a uniform resource locator entered or selected in an address field;
   code for receiving a command from a user of a browsing application to translate the web page comprising textual material and graphics appearing on the web page;
   code for causing said textual material to be passed from the computer to a translation resource on the network, wherein said code for causing said textual material to be passed to a translation resource comprises code for passing to said translation resource a uniform resource locator identifying a location of said textual material on said network; and
   code for causing said content display area to display the web page comprising a translation of said textual material, wherein said translation of said textual material comprises the web page having translated text arranged among graphics in a layout which is identical to a layout of the untranslated web page, wherein the browsing application allows the user to navigate to said web page and right-click anywhere in the web page to display a menu of translation options for the web page; and wherein the browsing application allows the user to select an arbitrary block of text or other characters on said web page, selects from and to languages from the translation options, and delivers the selected arbitrary block of text or other characters to a language translation engine on the network along with a request to translate the arbitrary block of text or other characters from and to the selected languages.

14. The computer-readable storage medium in accordance with claim 13, wherein said textual material is selected by said user by using a cursor to highlight text.

15. The computer-readable storage medium in accordance with claim 13, wherein said textual material comprises a plurality of characters.

16. A computer visibly displaying on a display of the computer a browsing application, the computer comprising:
 a processor for executing:
  code for retrieving, from a network, a web page and displaying the web page in a content display area of the browsing application executing on the computer in accordance with a uniform resource locator entered or selected in an address field;
  code for receiving a command from a user to translate the web page comprising textual material arranged among graphics appearing on the web page navigated to by the user over the network;
  code for causing said textual material to be passed from the computer to a translation resource on the network in response to said command, wherein said code for causing said textual material to be passed to a translation resource comprises code for passing to said translation resource a uniform resource locator identifying a location of said textual material on said network; and
  code for causing said content display area to display the web page comprising a translation of said textual material, wherein said web page having translated text arranged among graphics comprises a web page having a layout which is identical to a layout of the untranslated web page, wherein the browsing application allows the user to navigate to said web page and right-click anywhere in the web page to display a menu of translation options for the web page; and wherein the browsing application allows the user to select an arbitrary block of text or other characters on said web page, selects from and to languages from the translation options, and delivers the selected arbitrary block of text or other characters to a language translation engine on the network along with a request to translate the arbitrary block of text or other characters from and to the selected languages.

17. The computer in accordance with claim 16, wherein said textual material comprises textual material selected by said user.

18. The computer in accordance with claim 17, wherein said textual material selected by said user comprises textual material which is selected by using a cursor to highlight text.

19. The computer in accordance with claim 16, wherein said command from said user comprises a selection of a menu item in said menu.

20. The computer in accordance with claim 16, wherein said menu comprises a hierarchical nested menu.

21. The computer in accordance with claim 16, wherein said textual material comprises a plurality of characters.

22. The computer in accordance with claim 16, wherein said textual material comprises a graphical representation of a plurality of characters.

23. The computer in accordance with claim 16, wherein said code for causing said textual material to be passed to a translation resource comprises code for passing said textual material to said translation resource as a parameter in said uniform resource locator.

* * * * *